No. 798,334. PATENTED AUG. 29, 1905.
C. P. HALE.
FISH TRIMMING AND SPLITTING MACHINE.
APPLICATION FILED MAY 16, 1904.

2 SHEETS—SHEET 1.

Witnesses:—
F. C. Fliedner
J. A. Sourse

Inventor,
Cress P. Hale
By Geo. H. Strong, atty.

No. 798,334. PATENTED AUG. 29, 1905.
C. P. HALE.
FISH TRIMMING AND SPLITTING MACHINE.
APPLICATION FILED MAY 16, 1904.

2 SHEETS—SHEET 2.

Witnesses:—
F. C. Fliedner
J. A. Smse

Inventor,
Cress P. Hale
By Geo. H. Strong
Atty.

ANDREW B. GRAHAM CO., PHOTO-LITHOGRAPHERS, WASHINGTON, D. C.

UNITED STATES PATENT OFFICE.

CRESS P. HALE, OF SAN FRANCISCO, CALIFORNIA, ASSIGNOR TO THE CANNERS MACHINE CO., OF SAN FRANCISCO, CALIFORNIA, A CORPORATION OF CALIFORNIA.

FISH TRIMMING AND SPLITTING MACHINE.

No. 798,334.     Specification of Letters Patent.     Patented Aug. 29, 1905.

Application filed May 16, 1904. Serial No. 208,156.

*To all whom it may concern:*

Be it known that I, CRESS P. HALE, a citizen of the United States, residing in the city and county of San Francisco and State of California, have invented new and useful Improvements in Fish Trimming and Splitting Machines, of which the following is a specification.

My invention relates to improvements in fish-dressing apparatus. Its object is to provide a practical labor-saving device which will automatically remove the tail, fins, and head of large-sized fish, such as salmon and the like, and which will split the fish along the back to allow the removal of the backbone.

It consists of the parts and the construction and combination of parts, as hereinafter more fully described and claimed, having reference to the accompanying drawings, in which—

Figure 1:
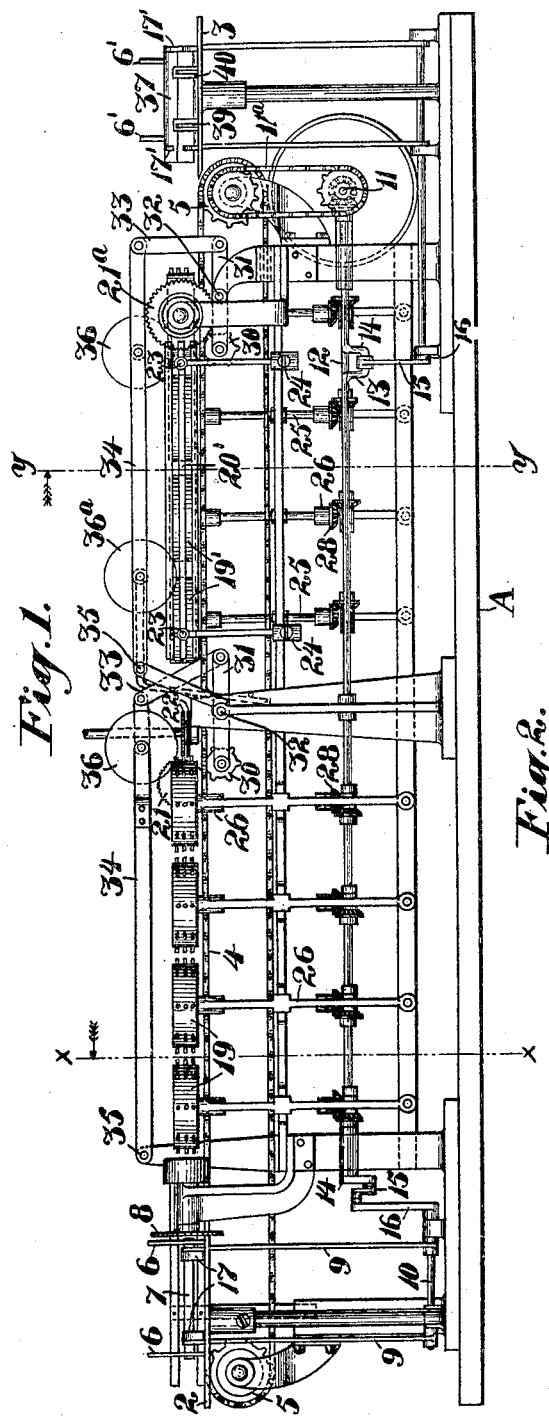
Figure 2:
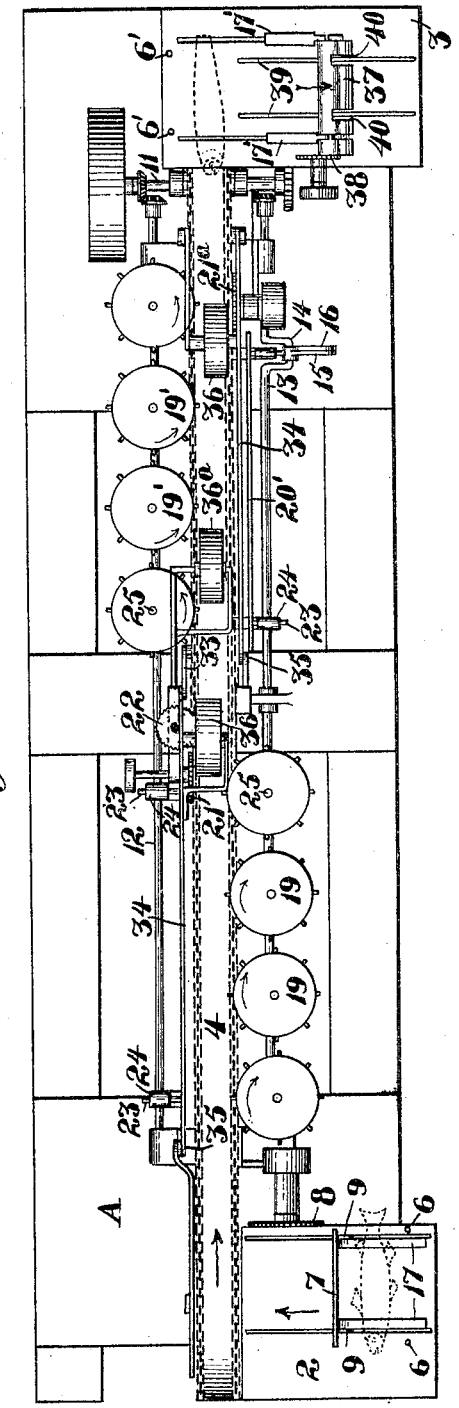
Figure 3:
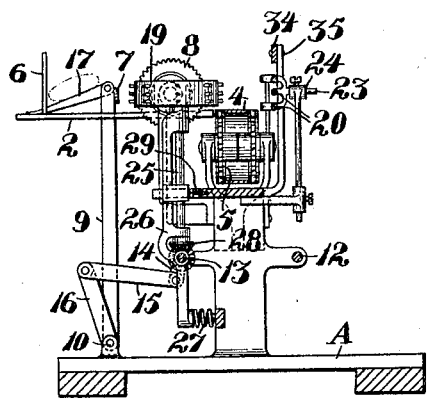
Figure 4:
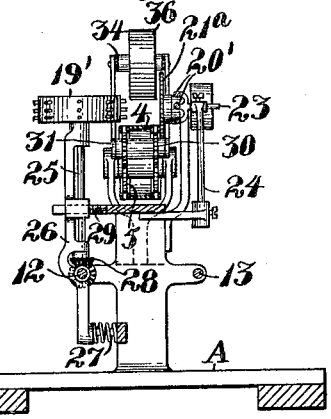
Figure 6:
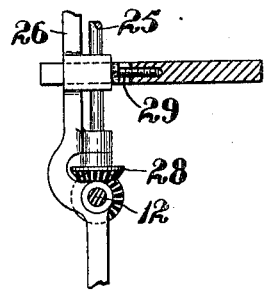
Figure 5:
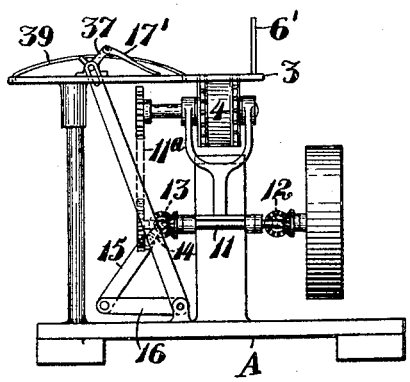

Figure 1 is a side elevation of my apparatus. Fig. 2 is a plan view of same. Fig. 3 is a section on line $x\,x$ of Fig. 1. Fig. 4 is a section on line $y\,y$ of Fig. 1. Fig. 5 is an end view looking from the right of Fig. 1. Fig. 6 is an enlarged view showing adjusting-pin.

A represents a suitable framework supporting the operating parts of my apparatus. 2 3 are tables arranged at opposite ends and to one side or the other of the frame, and 4 is a carrier movable between the tables and adapted as a support for the fish in their traverse from one table to the other through the machine. Carrier 4 comprises an endless link belt passing around sprockets 5, mounted on horizontal axes journaled in the frame and having its upper plane approximately flush with or a little below the surface of the tables to permit the fish easily to pass from a table to the carrier, or vice versa. The carrier is driven from the main drive-shaft 11 by suitable connections, as the chain 11ª, passing over a sprocket on shaft 11 and a corresponding sprocket on the shaft of one of the carrier-sprockets 5.

The fish to be trimmed is delivered by any suitable means upon table 2 in front of the guide-support 6, with the tail overhanging the inner edge of the table a distance equal to the amount to be cut off. A reciprocating carrier 7, operating at right angles to the direction of travel of carrier 4, then conveys the fish forward to bring the tail into engagement with the rapidly-revolving saw 8, and the de-tailed fish is placed upon carrier 4, by which it is moved through the machine and subjected to the various and successive operations necessary in preparing the fish for the cleaning-machine. The carrier 7 comprises a horizontal cross-bar loosely mounted on arms 9, movable in slots in the table, and which arms are fastened to a rock-shaft 10, working in unison with the other parts of the apparatus and driven from the main shaft 11. The latter operates two parallel shafts 12 13, running lengthwise of the machine. Shaft 13 on the side of table 2 carries a crank-arm 14, which connects by a link 15 with an arm 16 on shaft 10 to oscillate the latter and arms 9. Two inclined guides 17 are pivoted to the arms 9 with their free ends adapted to move back and forth on the table to slide under a fish deposited between the carrier 7 and guide 6 and cause the fish to be transferred by the backward movement of the carrier into position in front of the carrier. The travel of carrier 7 and the arrangement of stops 6 and guides 17 are such as always to enable the carrier to pick up a fish on its rearward movement and carry the fish on its succeeding forward movement against and past the cutter 8 and deposit it on carrier 4. The saw-cutter 8 is mounted on a horizontal arbor journaled in frame A and driven at high speed from any suitable source of power. The fish is always placed on table 2 with the tail toward the opposite end of the machine, and it is advanced on carrier 4 in this position. Various cutters for removing the dorsal, anal, and ventral fins are suitably arranged in the path of the fish in its transit through the machine. The pectoral fins are severed simultaneously with the head, as will be described later. Ordinarily where the fish is to be canned the fish may lie on either side, the cutting devices being arranged in complementary relation. However, in case it is desired to split the fish along the back to allow the backbone to be removed, as where the fish is to be salted down, it will always be deposited on carrier 4 with the back to the splitting devices. The machine is here shown with cutters to split as well as to trim the fish.

The carrier 4, upon which the fish merely rests by gravity, first brings the fish into engagement with a series of positively-driven circumferentially-spiked rollers 19, mounted on vertical axes which coöperate with the adjustable horizontal slotted guides 20 to carry the fish first past the saw 21, mounted on a horizontal axis to sever the dorsal fins, and then past two adjacently-disposed horizontal saws 22, which split the fish along the back on each side of the backbone to permit the subsequent removal of the latter. The guides 20 are slotted to allow the fins to project outward and bring them into proper relation to the cutters. The guides are fastened on brackets 23, which are horizontally adjustable in the vertically-adjustable standards 24. By this means the normal open space between the guides and rollers 19 may be varied, as desired. The rollers are yieldably supported to accommodate them to different sizes of fish and to the contours of any particular fish in the following manner: Each roller 19 is fast to a spindle 25, journaled in an arm 26, fulcrumed on shaft 13 and having a limited oscillating movement thereon. These arms have each a portion extending beyond the shaft, and a spring 27 acts to press each roller into the path of the fish. The lower end of each spindle carries a bevel-gear 28, engaging a similar gear on shaft 13, so that the rollers are rotatable in unison with shaft 13 at all points in their arc of movement about the fulcra of the several arms 26. Hence no matter what the size of a fish is once it is brought against the rollers 19 it is made to travel past the cutters and at all times to press into operative position with the cutters. The movement of the rollers toward their opposed guide 20 is limited and varied by means of the screw-pins 29. Usually the series of rollers will converge toward the cutting-point, and the tension of the springs 27 of the rollers nearest a cutter will be stiffest, so as to press the narrower tail part of the fish having the second dorsal or the anal fins in against the cutter and insure proper trimming.

As fish vary continually in size, it is essential to provide suitable means for centering them always relative to the cutters. This is accomplished in the present instance by means which permit a local depression of the upper plane of carrier 4, where the fish is larger, or an elevation in the vicinity of the cutters, where the fish is smaller, so that the fins may always be brought into the plane of a slot in guide 20. Accordingly adjacent to cutters 21 22 the upper plane of the carrier 4 is yieldingly supported on sprockets 30, carried on an arm 31, fulcrumed intermediate of its ends, as at 32, and which arm is connected at the end opposite to sprockets 30 by a link or links 33 with an arm 34, fulcrumed at 35 and carrying a vertical pressure-roller 36, disposed adjacent to a cutter. Normally the roller 36 and carrier 4 will approach each other so close as to insure the roller engaging the smallest fish handled, and they will coöperate to hold the fish from twisting onto its back or belly when being acted on by a cutter. The roller and the part of the endless support 4 immediately below will give or approach one another equally, according to the variations in pressure exerted by intermediate fish of different thicknesses; but the fins will always move in the same plane and be brought into operative engagement with the cutters. As stated, the cutters 21 and 22, respectively, sever the dorsal fins and form two incisions along each each side of the backbone. Passing the rollers 19 the fish is engaged between a second series of rollers 19', in all respects the counterpart of the first series, but arranged on the opposite side of the machine, and a slotted guide 20', where a vertical rotary cutter 21$^a$ successively removes the anal and ventral fins. As there are two ventral fins lying side by side, the guide 20' and also guide 20, for that matter, is formed with two parallel slots to receive each one of the ventral fins and guide them against the cutter. At the same time the dorsal and anal fins fit properly into either one of the slots in a guide.

36$^a$ is a pivotally-supported vertically-disposed roller, which acts to prevent the fish climbing or turning in passing from one series of rollers to the other.

From carrier 4 the fish are delivered onto table 3, where they are taken up singly by a trough-shape reciprocating carrier 37, operated in a manner similar to carrier 7 and synchronously with the latter, so that fish will not be delivered to carrier 4 faster or slower than they can be removed. Carrier 37 comprises a V-shaped trough, and the fish are either laid therein by hand or transferred from the table into it by sliding guides 17', coöperating with fixed guides 6' in a manner similar to the shipping means of carrier 7. With the fish lying on its belly and the head overhanging the end of the trough toward table 2 and with the pectoral fins caught over the edge of the trough and spread out the trough moves outwardly past saw 38 to sever the head close up under the pectoral fins.

By sending the fish-tail first through the machine it leaves the fish with the pectoral fins distended barb-like to catch and hold against the end of the trough and serve as guides to let just so much of the head project beyond the end of the trough as it is desired to cut off.

While the fish will be picked up automatically and deposited in the trough, it is a simple matter for the operator to slide the fish into proper position in the trough for the decapitating-cutter.

If desired, automatic means for removing the beheaded fish from the trough may be employed in the shape of two inclined rigid ways 39, disposed in the path of the trough and operating in slots 40 therein. By having the rear wall of the trough higher than the front wall the fish will be lifted on the outward movement of the trough to a height approximately that of the front wall, and when the trough returns the fish will slide out and down the ways 39 and be conveyed by any suitable means to the cleaning-machine.

Having thus described my invention, what I claim, and desire to secure by Letters Patent, is—

1. In a fish-dressing machine, the combination with carrier means for advancing a fish on its side, of a vertical cutter on one side of said carrier means to sever the dorsal fins and a succeeding vertical cutter on the opposite side of the carrier means to sever the ventral and anal fins, and a series of rollers on vertical axes opposite to each cutter between which rollers and cutters the carrier means operates.

2. In a fish-dressing machine, the combination with carrier means for advancing a fish on its side, of a vertical cutter on one side of said carrier means to sever the dorsal fins, a succeeding vertical cutter on the opposite side of the carrier means to sever the ventral and anal fins, rollers on vertical axes disposed opposite to each cutter and between which rollers and their respective cutters the said carrier means operates, and a horizontal splitting-knife between the two vertical knives.

3. In a fish-dressing machine, the combination with a conveyer for advancing a fish on its side, of successively-arranged definning vertical cutters on opposite sides of the conveyer, longitudinally-slotted guides between the cutters and carrier, and a series of yieldably-supported rollers on vertical axes disposed opposite to said guides and between which guides and rollers the conveyer operates, each series of rollers converging toward the guides and their respective cutters.

4. In a fish-dressing machine, the combination with a conveyer for advancing a fish on its side, of successively-arranged definning vertical cutters on opposite sides of the conveyer, longitudinally-slotted guides between the cutters and carrier, and a series of yieldably-supported rollers on vertical axes disposed opposite to said guides and between which guides and rollers the conveyer operates, each series of rollers converging toward the guides and their respective cutters, a vertically-yielding overhead support for the fish, a knife proximate to said support and beneath which knife the fish is conveyed.

5. In a fish-dressing machine, the combination with a suitable support, of an endless carrier, a rigid longitudinally-slotted guide parallel with and to one side of the carrier, a fin-cutter to one side of, proximate to and in a plane parallel with said guide, a second cutter in a plane substantially perpendicular to the plane of said guide and projecting through the slot therein and adapted to split the fish, and a series of yieldably-supported rollers opposing said guide and cutters.

6. In a fish-dressing machine, the combination with a suitable support, of an endless carrier, a rigid longitudinally-slotted guide parallel with and to one side of the carrier, a fin-cutter to one side of, proximate to and in a plane parallel with said guide, a second cutter in a plane substantially perpendicular to the plane of said guide and projecting through the slot therein and adapted to split the fish, a series of yieldably-supported rollers opposing said guide and cutters, said series of rollers converging toward one end of said guide, and means for giving the rollers a positive rotary movement.

7. A fish-dressing machine having in combination a conveyer means, a series of yieldingly-supported rollers, and a guide opposing the rollers and between which and the rollers the fish is carried by the conveyer, said series of rollers converging toward the guide, a cutter between the rollers and guide and disposed in the path of travel of the fish, an oscillating support for each roller, a spindle connected with each roller and carried by the support, and connections between said spindle and a source of power.

8. In a fish-dressing machine, the combination of an endless carrier, end sprockets on horizontal axes around which said carrier passes, trimming devices proximate to the carrier and arranged to operate on the passing fish, and centering means disposed relative to said trimming devices, said centering means comprising a lever fulcrumed intermediate of its ends and disposed between the two planes of the carrier, sprockets at one end of said lever supporting the upper plane of the carrier, a second lever fulcrumed at one end and disposed above the upper plane of the carrier, a presser-roller carried by said second lever and between the ends thereof, and a link connecting the free ends of the two levers.

9. In a fish-dressing machine, the combination with carrier means, a table and cutting mechanism of a lateral reciprocating carrier comprising a bar movable over the surface of a table, stops in the path of said bar and hinged inclined sliding guides carried by said bar and coöperating with said stops to shift a fish from one side of the bar to the other.

10. In a fish-dressing machine, the combination of a table, a carrier reciprocal thereover, stationary stops in the path of said carrier, means carried by the carrier coöperating with said stops to shift a fish from one side to the other of the carrier, a vertical knife to one side of said carrier and operating in a plane parallel with the direction of movement of said carrier, an endless conveyer operating at right angles to the direction of movement of the first carrier and upon which the fish is deposited by said first carrier from the table, means coöperating with said conveyer to advance the fish and trimming appliances arranged in the path of the fish carried by said conveyer.

11. In fish-dressing apparatus, the combination with fish-conveying means, of a table on which the fish is delivered therefrom, a trough-shaped carrier extending in the direction of movement of said conveying means and operatable at right angles thereto and across said table, means for delivering the fish from the table into said trough, and a cutter to one side of the path of the trough to sever an extremity of the fish.

In testimony whereof I have hereunto set my hand in presence of two subscribing witnesses.

CRESS P. HALE.

Witnesses:
S. H. NOURSE,
JESSIE C. BRODIE.